Jan. 6, 1953 M. H. BOYER 2,624,199
FLUID FLOWMETER
Filed March 29, 1946 2 SHEETS—SHEET 2
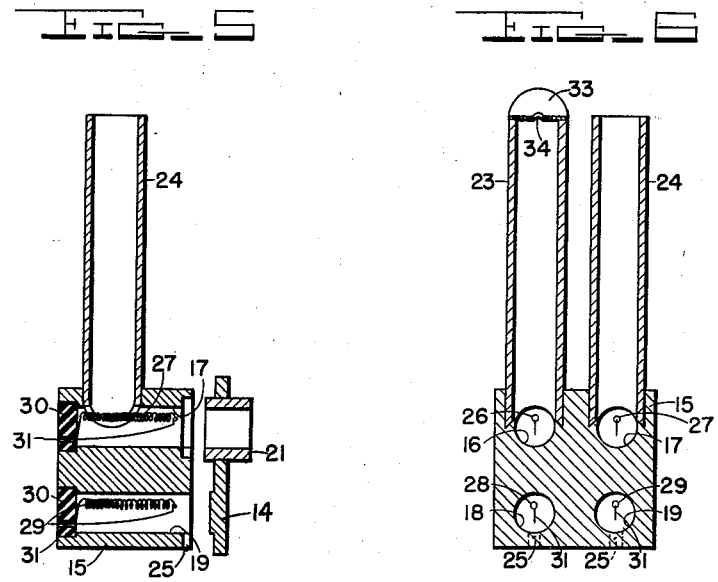
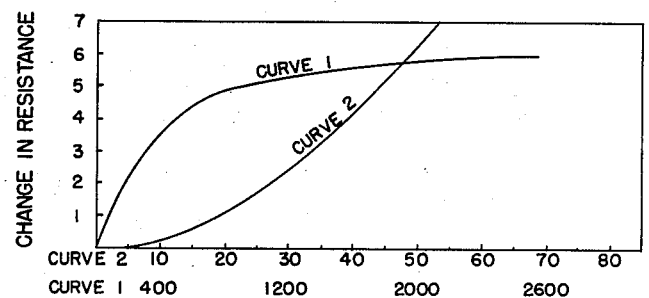
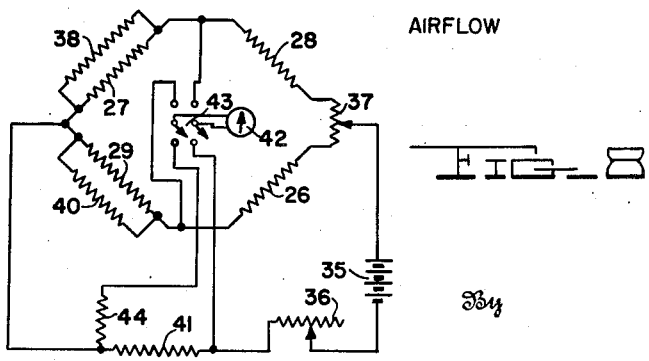
Inventor
MYRON H. BOYER
By M. A. Hayes
Attorney Patented Jan. 6, 1953

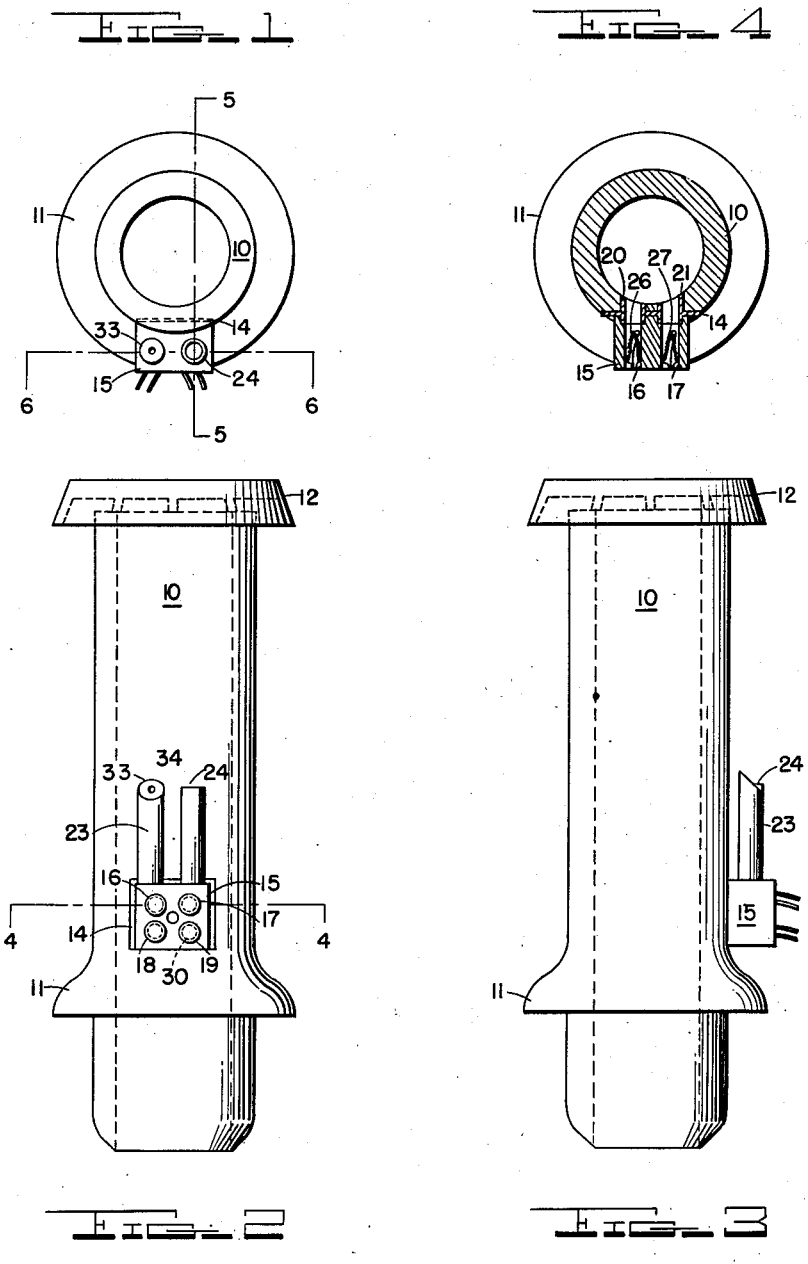

2,624,199

UNITED STATES PATENT OFFICE 2,624,199

FLUID FLOWMETER

Myron H. Boyer, Puente, Calif.

Application March 29, 1946, Serial No. 658,193

8 Claims. (Cl. 73—202)

(Granted under Title 35, U. S. Code (1952), sec. 266)

This invention relates to fluid flow meters, and more particularly to a fluid flow meter in which the cooling of a hot wire by convection or gas velocity is employed as a measure of the fluid flow rate.

In certain applications wherein the rate of fluid flow is to be ascertained, it is necessary not only that the measuring device be highly accurate but also that disturbance of the fluid flow by the measuring device be held to a minimum. However, most conventional fluid flow measuring devices are so constructed that disturbance of the fluid flow is essential to the operation of the measuring device. For example, in vane type devices, the vane serves as a restriction when used in a duct or as a deflector when employed in the open; in either case considerably disturbing the fluid flow.

Avoidance of any disturbance of the air flow is particularly important in connection with the ventilation of submarine storage batteries, because variation in air flow can cause considerable damage to the batteries as well as endanger men on the submarine. A submarine storage battery evolves hydrogen at various rates during charge and at a very low rate during discharge or stand. In order to remove this hydrogen from the space above the electrolyte in the cells, the cells must be separately and properly ventilated. This is done by drawing air from the battery compartment into and through the cells and then discharging it outboard or into some other part of the submarine, the optimum rate of ventilation depending upon the particular region of the normal charge-discharge cycle in which the battery is operating. The system which supplies this ventilation is ordinarily so arranged that all cells in a battery are connected in parallel to the input of a single ventilation blower. Such an arrangement is, however, subject to wide and highly undesirable variations in the flow of air through individual cells if small differences exist in the flow resistances either of the cells or of the ventilation ducts leading to them. Accordingly, in order to make possible equalization of the air flow, a variable restriction is built into each cell so that its resistance can be adjusted until all cells are being ventilated at approximately the same rate. Proper adjustment of the variable restrictions requires that the fluid flow rate be accurately measured and yet that the introduction of the measuring device not disturb the fluid flow. It will be readily understood that the disturbance which might result from the introduction of the measuring device would be apparently only from its ultimate effects on the system in which it is used and not from any indication provided by the measuring device.

In general, it may be stated as a fundamental requirement that in balancing the air flow through a large number of branches of a parallel system such as that described, the measuring instrument which is to be used must either cause negligible disturbances of the air flow or the same proportionate disturbance in all branches. The effect of inserting a measuring instrument will, however, depend upon the relative values of the pressure drop across the instrument and the pressure available for forcing the air through the system. If they are of the same order of magnitude, the disturbance will be very large. On the other hand, if the drop across the instrument is very small compared to the total, the disturbance will be negligible. Conventional types of flow-meters have been found to cause a comparatively large alteration in the flow of air through a cell and consequently, since the air flow in different parts of the battery is not uniform, such meters have a disturbing effect which is not the same throughout the battery. Proper equalization of ventilation is accordingly impossible with such instruments.

An object of the present invention is to provide a new and improved apparatus for fluid flow measurement, and more particularly an apparatus for fluid flow measurement which may be employed without introducing any disturbance of the fluid flow rate being measured.

A further object of the present invention is to provide a new and improved fluid flow meter in which the cooling of a heated element by convection may be utilized as a measure of the rate of fluid flow past the element.

A further object is to provide a fluid flow meter in which the cooling of a heated element by convection is utilized as a measure of the rate of fluid flow and in which the effects of cooling due to radiation and thermal conductivity are effectively cancelled.

Other objects and advantages of the present invention will be apparent from the following detailed description taken in conjunction with the drawings, wherein:

Figure 1 is a plan view of a fluid flow meter constructed in accordance with one embodiment of this invention and adapted for measuring the air flow used in ventilating a battery;

Figure 2 is a front elevation of the device shown in Figure 1, the device having a cap mounted on its upper end;

Figure 3 is a side elevation of the device shown in Figure 2;

Figure 4 is a transverse, sectional view taken along the line 4—4 of Figure 2;

Figure 5 is a detail, vertical, sectional view taken substantially along the line 5—5 of Figure 1;

Figure 6 is a detail, vertical, sectional view taken substantially along the line 6—6 of Figure 1;

Figure 7 is a graphic representation of the cooling of a heated body by convection at two different initial temperatures and flow ranges; and Figure 8 is a schematic diagram showing the circuit employed with this meter.

Heat may be lost from a body in three ways: radiation, thermal conductivity, and convection, the total loss being the sum of the losses by these three processes. While the rate at which heat is lost from a body by radiation or thermal conductivity is independent of the fluid flow past the body, the rate at which heat is lost from a body by convection depends upon the velocity of fluid flow, this rate being determined according to a law which has been mathematically derived only for regions somewhat removed from the zero point. This law indicates that the heat loss from a body by convection is proportional to the square root of the velocity and may be stated as follows:

$$H_c = K V^{1/2} \theta \qquad (1)$$

wherein, $H_c$=the heat loss by convection, $K$= a constant, $V$=the velocity of the fluid, and $\theta$ equals the temperature difference obtaining between the body and its surrounding fluid. This law is substantially obeyed if the temperature of the hot body is maintained constant. However, if the heat input to the body is maintained constant instead, then at equilibrium the total heat loss will equal the heat input and consequently the temperature of the body will depend upon the fluid flow as follows:

$$H = K \theta V^{1/2} + K_T \theta \qquad (2)$$

wherein $K_T$ is the thermal conductivity of the fluid. Accordingly, if Equation 2 be solved for $\theta$ then $$\theta = \frac{H}{K V^{1/2} + K_T} \qquad (3)$$

From Equation 3 it will be observed that as the fluid velocity increases, the temperature of the body drops by an amount which tapers off and approaches asymtotically to a line representing the condition where the temperature of the body has reached the temperature of the fluid. This behavior is shown by curve 1 of Figure 7.

In the region of air flows approaching the zero point, the preceding considerations do not apply. The phenomena which occur here are difficult to evaluate precisely but from a practical standpoint it has been established that in this region the heat loss by convection varies according to approximately the square of the velocity of flow rate for comparatively low temperatures. This may be expressed by the following equation:

$$\theta = \frac{H}{K V^2 + K_T} \qquad (4)$$

Curve 2 of Figure 7 illustrates this relation for low values of V.

Inspection of curves 1 and 2 of Figure 7 reveals that they are supplementary to each other; that is, where one has its maximum sensitivity, the other is at a minimum, and vice-versa. Accordingly, if these curves are added, their sum will approach a straight line. In accordance with the present invention a fluid flow meter has been provided which, in effect, enables addition of the two curves to provide an indication which will be essentially linear for both low and high fluid flow rates and at the same time causes substantially no disturbance of the air flow itself.

Referring now to Figure 1 it will be seen that a flow tube 10 is illustrated through which a gas may flow at a rate which it is desired to ascertain. In a particular case, the tube may be designed so as to be inserted in a fluid flow system as a part of the duct or conduit thereof, or may be an integral section thereof. For example, where the fluid flow meter of this invention is to be employed in measuring the rate of air flow used in ventilating a battery, the tube 10 is constructed as shown in these drawings so as to have an annular shoulder or flange 11 integrally formed adjacent its lower end, the shoulder 11 being adapted to rest on the edge of a battery venting aperture, not shown. When so employed, the tube 10 is substituted for the usual battery cap, and the flow tube is so designed that the upper end is a replica of the standard battery intake, including the cap 12, the underside of which is recessed to permit air to be drawn into the tube 10. It will be understood, however, that adaptation of the device of this invention to the measurement of air flow in conduits or ducts may readily be made as the circumstances of a particular case require.

In the particular case shown in the drawing, a portion of the side of the tube 10 immediately above the annular shoulder 11 is recessed slightly to receive a small, flat, rectangular mounting plate 14, which is rigidly secured to the side of the tube by suitable means. The mounting plate 14 serves as a support for a substantially rectangular block 15 which in turn serves as a filament housing and contains four filament chambers 16, 17, 18 and 19, consisting of substantially cylindrical apertures symmetrically placed about the center of the block and passing through it in such a way that they extend from the left to the right side of the block, as viewed in Figure 5. The upper portion of the mounting plate 14 is transversely apertured to receive two short tubes 20 and 21 the outer ends of which, when the block 15 is assembled on the plate 14, extend into the chambers 16 and 17 respectively and the inner ends of which extend through the wall of the flow tube 10 to communicate with the interior passage thereof, the side wall of the flow tube being suitably apertured to permit the tubes 20 and 21 to extend therethrough. Communicating with the left ends of filament chambers 16 and 17 as viewed in Figure 5 and extending upwardly therefrom are two vertically disposed tubes 23 and 24 whereby air may be admitted to the filament chambers 16 and 17.

When a fluid is flowing through a tube containing a restriction of any type, a difference will exist in the fluid pressure on the two sides of the restriction, and if a by-pass is inserted around the restriction, this pressure difference will cause fluid to flow through the by-pass. Then, the rate of flow through the by-pass will be a function of the rate of flow through the main tube. In the present instrument, the battery cap 12 serves as a restriction to produce the required pressure difference, and the passages through the tubes 23 and 24 the chambers 16 and 17, and the tubes 20 and 21 serve as by-passes. Other means for producing the pressure difference than the battery cap, such as an adjustable diaphragm, can readily be substituted for the battery cap, as will be readily apparent and where the fluid flow rate is high, in some cases because of the aspirative effect of the fluid flowing past the inner ends of the short tubes 20 and 21, sufficient air will be drawn through the filament chambers 16 and 17 without using a restriction.

As shown in Figures 5 and 6, in each of the chambers 16, 17, 18 and 19, is positioned a resistance wire or filament, the filaments being designated respectively 26, 27, 28 and 29. Since the upper chambers 16 and 17 form by-pass paths, the filaments 26 and 27 located therein are subjected to a fluid flow proportional to the flow through the main tube. The filaments 28 and 29 in the lower chambers 18 and 19 are isolated from all flow effects, provision being made, however, for the surrounding atmosphere to enter these chambers by diffusion through small ports 25 formed in the block 15 and extending from the interior of the chambers 18 and 19 to the side of the block. The diffusion so obtained balances out any changes in the thermal conductivity of the air due to the pressure of gases such as hydrogen or carbon dioxide. While any suitable filament design may be employed, that shown in the drawings, has been found to be satisfactory. As may be seen in Figures 4 and 5 in this filament design the filament is bent to have a V-shape with the apex of the V extending toward the flow tube 10. The outwardly extending ends of the filaments are mounted in a supporting button 30 which is made of a suitable insulating material, and which is mounted in the outer end of each of the filament chambers, the buttons being countersunk into the chamber and sealed thereto. In order to support the inner ends of the filaments, a supporting lead 31 is provided for each filament and has one end rigidly mounted in the associated button 30 while its other end extends to the apex of the filament. This lead is best shown in Figure 5. As these four filaments are to serve as the four legs of a Wheatstone bridge, it is essential that a symmetrical arrangement be maintained and that they be substantially identical. By arranging the filaments symmetrically in four cylindrical chambers of identical size and shape, as described, heat losses due to radiation and thermal conductivity are made substantially equal from all filaments, and consequently because of the Wheatstone bridge arrangement, cancel.

In the operation of this flow meter, air passes downwardly through the flow tube 10 and because of the restriction provided, in the particular instance shown by the cap 12, a pressure drop is created, creating in turn a vacuum of a degree equivalent to the pressure drop which is utilized to draw air through the tubes 23 and 24 and over the filaments 26 and 27 disposed in the chambers 16 and 17 respectively. It is well known that the electrical resistance of most metals is a function of temperature within certain limits of temperature, that is to say that the resistance of the metal will change within this region of temperature in the same way as does the temperature. Consequently, curves 1 and 2 of Figure 7 also represent the relation between the change of electrical resistance of the filament and the velocity of the surrounding fluid, the relation being shown for two substantially different ranges of flow rates. As hereinbefore explained, by combining the results expressed in curves 1 and 2 of Figure 7, an essentially linear relation is obtained.

In accordance with the present invention, a flow meter has been provided in which an essentially linear indication is obtained by automatically combining the results expressed in curves 1 and 2 in which at the same time heat losses due to radiation and to thermo-conductivity are eliminated from the indication produced by the meter. Referring to Figures 1 and 6 it will be seen that while the by-pass tube 24 is open to its full diameter at its upper end, the by-pass tube 23 is sealed at its upper end by a cover plate 33 except for a small aperture 34 formed in the center of the cover plate. Since the size of the opening provided by the aperture 34 is very much less than the size of the opening at the upper end of the tube 24, it will be readily apparent that the air flow through the tube 23 will be correspondingly less than the air flow through the tube 24 resulting from the vacuum in the main flow tube. Thus the conditions required for simulating both curves 1 and 2 of Figure 7 are provided. In practice it has been found desirable to make the aperture 34 approximately $\frac{1}{10}$ the size of the aperture at the upper end of the tube 24, thus permitting an air flow through the tube 23 approximately $\frac{1}{10}$ the air flow through the tube 24.

In the present invention the resistance changes of the two filaments 26 and 27 are added by connecting these two filaments as opposite legs of a Wheatstone bridge, as shown in Figure 8, filaments 28 and 29 forming the other pair of legs of the bridge. Any suitable measuring circuit may be employed, and the circuit shown in Figure 8 is merely illustrative of a bridge circuit adapted to the requirements of this invention. It consists essentially of means for measuring and for controlling the bridge current, for adjusting the bridge balance, and for indicating the unbalance which occurs with flow. The same indicating device is used for both bridge balance indication and bridge current indication by operating a switch. Referring to Figure 8 it will be seen that this circuit includes a source of electrical power 35, such as a battery, which is connected across the bridge through variable resistance 36, whereby the current level is controlled, and a bridge balancing resistance 37 connected between filament 26 and 28 to balance the bridge at zero air flow. Since the filament 27 is located in the chamber through which the air flow rate is greater, it is desirable that this filament be operated at a lower temperature level than the filament 26, located in the low flow rate chamber, so that the actual temperature change in response to the fluid flow will be substantially the same in both filaments. Thus shunt resistance 38 is connected across filament 27, thereby reducing the current applied to filament 27. In order to maintain symmetry, inactive filament 29 is shunted by resistance 40 which has exactly the same value as resistance 38. Resistance 41 is the bridge current shunt for the indicating meter 42 and is selected to have a suitable value so that the potential drop across it will provide a full scale reading on the meter at the desired bridge current. Double pole, double throw switch 43 makes possible using the single meter 42 to measure either bridge balance or bridge current.

As this apparatus normally possesses a temperature coefficient due to changes in gas density, the temperature coefficient of the meter 42, and to other causes, which act to increase the reading of the meter 42 for a given airflow as the temperature increases, where a high degree of accuracy is desired, a temperature compensating resistor 44 is inserted in the bridge current metering circuit as shown. Thus, when switch 43 is in the bridge current metering position, resistance 44 automatically requires that resistance 36 be reset, as the temperature rises, to a value which increases the bridge current necessary for full scale deflection of meter 42. By proper selection of the magnitude of this resistance it is possible to compensate the instrument so that a given reading indicates airflow independently of temperature, either according to the weight of air which is passing, or according to the actual volume at the temperature of the measurement.

In the operation of this apparatus and particularly in the calibration of the apparatus certain adjustments may be necessary in order to obtain a suitably linear response. It has been stated hereinbefore that the low temperature filament 27 has its maximum sensitivity in the initial part of the calibration curve while the high temperature filament has its minimum sensitivity at this point. At the top end of the calibration curve the opposite is true. In general it may be said that the lower temperature filament controls the shape of the lower end of the curve and the higher temperature filament controls the shape of the upper end. Thus if the initial calibration curve shows a hump or a sag at the lower end, it may be straightened by decreasing or increasing respectively the effectiveness of the low temperature filament. This in turn is accomplished by decreasing or increasing the value of the shunt resistances. Similarly if the upper end of the curve is cupped either up or down, it can be straightened by controlling the effectiveness of the high temperature filament. This is, however, a little more difficult since the current through the high temperature filament can be changed only by changing the bridge current. This normally alters the current through the low temperature filament so that the net result is a change in range of the instrument with no appreciable change in the change of the calibration curve. The effectiveness of the high temperature filament is changed most easily by varying the by-pass orifice size, that is the size of the aperture 34. In general if the upper end of the curve is cupped downwardly it indicates that too great a length of the normal hot wire calibration curve is being utilized by the high temperature filament. This must be corrected by decreasing the orifice size. Such a decrease will also result in an increase in the range of the instrument which may in turn be corrected by raising the bridge current. As a result of this it may then be necessary to decrease the shunt resistance on the low temperature filament. If the upper end of the curve is cupped upwardly, it may be corrected by corresponding changes in the opposite direction.

From the foregoing it will be apparent, that a fluid flow meter has been provided in which the cooling of a hot wire by convection or gas velocity is employed as a measure of the fluid flow rate and which is so designed that changes in the temperature of the hot wire due to radiation or to thermal conductivity are automatically eliminated. It will be further apparent that the introduction of this device into a fluid flow system involves substantially no interference with the normal flow of the fluid.

Where herein the various parts of the invention have been referred to as being located in a right or left position, it will be understood that this is done solely for the purpose of facilitating description and that the references relate only to the relative positions of the parts as shown in the accompanying drawing.

While but one embodiment of this invention has been shown and described, it will be understood that many changes and modifications may be made therein and that the device may be employed in many other situations besides determining the rate of fluid flow in ventilating a storage battery.

The invention shown and described herein may be manufactured and used by or for the Government of the United States of America for governmental purposes without the payment of any royalties thereon or therefor.

What is claimed is:

1. A fluid flow meter including a first bypass duct having a relatively small effective diameter for passing a proportionate part of the flow to be measured at velocities approaching the zero velocity, a second bypass duct having a large effective diameter relative to said first duct for passing a proportionate part of the flow to be measured at velocities substantially greater than the fluid velocity in the first duct, first and second thermally responsive elements disposed in the flow paths of said first and second ducts respectively, the fluid passing over said elements causing a thermal response in accordance with the heat lost by said elements by convection, and indicating means coupled to said elements operative to cumulatively indicate the thermal response thereof.

2. A fluid flow meter including a first duct adapted to pass a proportionate part of the flow to be measured at velocities approaching the zero velocity, a second duct adapted to pass a proportionate part of the flow to be measured at velocities substantially greater than the fluid velocity in the first duct, first and second thermally responsive elements disposed in the flow paths of said first and second ducts respectively, the fluid passing over said elements causing a thermal response in accordance with the heat lost by said elements by convection, means coupled to said elements for compensating for the thermal response of said elements caused by variations in the thermal conductivity of said fluid, and indicating means coupled to said elements operative to cumulatively indicate the thermal response thereof.

3. A fluid flow meter including a first bypass duct having a relatively small effective diameter for passing a proportionate part of the flow to be measured at velocities approaching the zero velocity, a second bypass duct having a large effective diameter relative to said first duct for passing a proportionate part of the flow to be measured at velocities substantially greater than the fluid velocity in said first duct, first and second elements disposed in the flow paths of said first and second ducts respectively thermally responsive to variations in fluid flow thereover, an electrical circuit including said elements, and indicating means in said circuit operative to cumulatively indicate the response of said elements.

4. A fluid flow meter including a first bypass duct having a relatively small effective diameter for passing a proportionate part of the flow to be measured at velocities approaching the zero velocity, a second bypass duct having a large effective diameter relative to said first duct for passing a proportionate part of the flow to be measured at velocities substantially greater than the fluid velocity in said first duct, first and second electrical resistance elements disposed in the flow paths of said first and second ducts respectively thermally responsive to variations in fluid flow thereover, an electrical circuit including said elements, and indicating means in said circuit operative to cumulatively indicate the response of said elements.

5. A fluid flow meter for measuring fluid flow through a conduit including a first duct leading from said conduit and having a relatively small effective diameter for passing a proportionate part of the flow to be measured at velocities approaching the zero velocity, a second duct leading from said conduit and having a large effective diameter relative to said first duct for passing a proportionate part of the flow to be measured at velocities substantially greater than the fluid velocity in said first duct, first and second electrical resistance elements in said first and second ducts respectively thermally responsive to fluid flow variations therein, and indicating means coupled to said elements operative to cumulatively indicate the thermal response of said elements.

6. A fluid flow meter including a first duct adapted to pass a proportionate part of the flow to be measured at velocities approaching the zero velocity, a second duct adapted to pass a proportionate part of the flow to be measured at velocities substantially greater than the fluid velocity in said first duct, first and second electrical resistance elements disposed in the flow paths in the first and second duct respectively thermally responsive to variations in fluid flow thereover, an electrical circuit including said elements, means in said circuit for maintaining said first element at a higher temperature level than said second element, and indicating means in said circuit operative to indicate the cumulative response of said elements.

7. A fluid flow meter including a first bypass duct having a relatively small effective diameter for passing a proportionate part of the flow to be measured at velocities approaching the zero velocity, a second bypass duct having a large effective diameter relative to said first duct for passing a proportionate part of the flow to be measured at velocities substantially greater than the fluid velocity in said first duct, first and second electrical resistance elements disposed in the flow paths in the first and second ducts respectively thermally responsive to variations in fluid flow thereover, a bridge circuit including said elements as opposite legs thereof, and a meter arranged in said bridge circuit operative to cumulatively indicate the thermal response of said elements.

8. A fluid flow meter including a first bypass duct having a relatively small effective diameter for passing a proportionate part of the flow to be measured at velocities approaching the zero velocity, a second bypass duct having a large effective diameter relative to said first duct for passing a proportionate part of the flow to be measured at velocities substantially greater than the fluid velocity in said first duct, first and second electrical resistance elements disposed in the flow paths in said first and second ducts respectively thermally responsive to variations in fluid flow thereover, a bridge circuit including said elements as opposite legs thereof, a meter arranged in said bridge circuit operative to cumulatively indicate the thermal response of said elements, and electrical resistance means in said bridge circuit for compensating for the thermal response of said elements caused by variations in the thermal conductivity of said fluid.

MYRON H. BOYER.

REFERENCES CITED

The following references are of record in the file of this patent:

UNITED STATES PATENTS

| Number | Name | Date |
| --- | --- | --- |
| 790,888 | Ferris | May 30, 1905 |
| 797,027 | Tilden | Aug. 15, 1905 |
| 1,254,871 | Wilson | Jan. 29, 1918 |
| 1,261,086 | Wilson et al. | Apr. 2, 1918 |
| 1,265,775 | Hadaway | May 14, 1918 |
| 1,308,569 | Wylie | July 1, 1919 |
| 1,987,617 | Graham et al. | Jan. 15, 1935 |
| 2,067,645 | Pinkerton | Jan. 12, 1937 |
| 2,076,442 | Borden | Apr. 6, 1937 |
| 2,085,224 | Krueger | June 29, 1937 |
| 2,269,850 | Hebler | Jan. 13, 1942 |
| 2,322,018 | Huber | June 15, 1943 |
| 2,329,840 | Keinath | Sept. 21, 1943 |
| 2,371,253 | Moore | Mar. 13, 1945 |
| 2,412,471 | Olson | Dec. 10, 1946 |
| 2,420,539 | Hornfeck | May 13, 1947 |

FOREIGN PATENTS

| Number | Country | Date |
| --- | --- | --- |
| 174,338 | Great Britain | Feb. 22, 1923 |